Sept. 20, 1932.   W. R. WALKER   1,878,212

PRODUCTION OF ELECTRICAL LEAD-IN DEVICES

Filed Jan. 9, 1929

INVENTOR
Warren R. Walker
BY
Thos. H. Brown
HIS ATTORNEY

Patented Sept. 20, 1932

1,878,212

UNITED STATES PATENT OFFICE

WARREN R. WALKER, OF SHORT HILLS, NEW JERSEY, ASSIGNOR TO GENERAL ELECTRIC VAPOR LAMP COMPANY, OF HOBOKEN, NEW JERSEY, A CORPORATION OF NEW JERSEY

PRODUCTION OF ELECTRICAL LEAD-IN DEVICES

Application filed January 9, 1929. Serial No. 331,320.

The present invention relates to electrical lead-ins and the method of making the same. The particular object of the invention is to provide a convenient means for soldering electrical connections to the exterior end of a lead-in wire of the type used in mercury switches, mercury arc lamps and other sealed vitreous envelopes. These lead-ins are commonly of tungsten or like material, to which it is relatively difficult to solder electrical connections, since hard solder must be used. To overcome this difficulty the exterior end of the lead-in has been modified by a metal such as nickel. It has been customary, for example, to clean and nickel plate the exterior end of the lead-in so that electrical connection may be made to the nickel coating by means of ordinary soft solder. Other methods of attaching another metal to the tungsten including butt welding a nickel wire to the tungsten lead-in, have also been suggested. These methods have proved quite satisfactory for general use, but for certain purposes a lead-in having not only a greater mechanical strength than the butt welded type but also a thicker coating of the metal than could be conveniently plated thereon, has been desired.

By my new method of applying the desired metal a lead-in having these desired characteristics may be readily produced. This method consists in placing a sleeve of the softer metal about the tungsten lead-in and welding the two together at the tip of the lead-in. In this manner a coating of any desired thickness may be obtained, and the lead-in will be of the same strength as the bare tungsten wire, since the weld is not a source of weakness with this new construction. The heat required is no greater than for the butt welding method of the prior art, and is so localized that it is possible to apply the sleeve in this manner to a lead-in which has already been sealed into its envelope. It is, therefore, apparent that my new method is not only very simply and easily performed but also results in a superior product.

Figure 1:
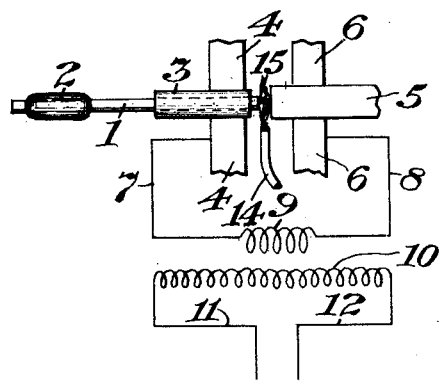
Figure 2:
Figure 3:
Figure 4:
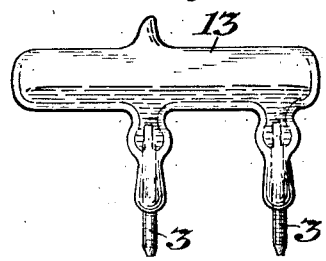

In the accompanying drawing:

Fig. 1 diagrammatically represents a preferred method of applying and welding a sleeve to a lead-in such as is used in a mercury switch, Fig. 2 shows a modification of the sleeve on the lead-in, preparatory to welding, Fig. 3 represents the product, and Fig. 4 illustrates the sleeve welded to a lead-in which had previously been sealed into an envelope.

According to this invention a lead-in wire 1 of tungsten or other suitable metal, and having a vitreous sheath 2 fused thereto near one end thereof, has a sleeve 3 of nickel or other similar metal welded thereto near the end opposite said vitreous sheath. The preferred method of welding said sleeve 3 to said lead-in 1 will now be described.

Sleeve 3, which may be either nickel tubing, sheet nickel bent into tubular form or a helix formed of nickel wire is placed upon lead-in wire 1, with a small amount of said lead-in 1 protruding, as shown in Fig. 1. Sleeve 3 is now placed between one set of jaws 4 of a conventional butt welding machine. A copper rod 5 is placed between the other set of jaws 6. Jaws 4 and 6 are connected respectively through leads 7 and 8 to a transformer secondary 9, to which electrical energy is supplied by the primary 10, which in turn is connected to a suitable source of electricity by means of leads 11 and 12. When copper rod 5 is moved against lead-in 1 a heavy current is caused to flow which sets up intense local heating in the protruding end of lead-in 1, due to the relatively high resistance at that point. As the heat is conducted to sleeve 3 the adjacent end thereof melts and fuses with the lead-in 1, forming a perfect welded union at the tip, as shown in Fig. 3. The jaws 4 have a relatively large contact area, and are applied under considerable pressure in order to avoid resistance heating at the point of contact with the sleeve 3, and between sleeve 3 and lead-in 1, as much as possible, and also have considerable heat capacity in order to maintain the end of said sleeve 3 adjacent to the fused sheath 2 relatively cool.

After the sleeve 3 has been welded to lead-in 1 it is tinned by dipping in soft solder in order to facilitate attaching leads thereto. The solder adheres to said sleeve, forming a smooth coating thereon so that Fig. 3 represents the appearance of the finished product with either the tubular or helical sleeve.

By this method the sleeve 3 can be welded to the lead-in 1 without damage to the fused vitreous sheath 2, even though the exposed portion of the lead-in wire be not more than one fourth inch long on the end to which the nickel sleeve is welded. It is also possible to weld the sleeve 3 to the lead-in 1 after said lead-in 1 has been sealed into a vitreous envelope 13, as shown in Fig. 4, if it is desired.

The above welding operation is preferably carried out in a reducing atmosphere to prevent oxidation of the lead-in during the welding process. A convenient method of supplying such an atmosphere is illustrated in the pipe 14, connecting to a suitable source of hydrogen, the flame 15 on the end thereof playing about the portion of the lead-in which is to be heated. Due to the well known affinity of the hydrogen for oxygen the region within the flame is maintained substantially free of oxygen.

While I have shown and described one process for producing my product, it is obvious that various changes may be made in the process without modifying or changing the essential features and characteristics of the product produced, and that likewise various changes may be made in the product, such as changes in shape, material, relative proportions, etc. without departing from the spirit of the invention.

I claim:

1. The method of producing a metal coating on a lead-in wire which consists in placing a metal sleeve on the lead-in with the end of said lead-in protruding a small amount and applying a welding heat to the exposed end of said lead-in.

2. A lead-in wire of tungsten having a sleeve of a metal to which solder will adhere closely fitting said wire with the end of said wire protruding a small amount from said sleeve, said inlead being welded to said sleeve at a point adjacent to said protruding end.

3. The method of producing a metal coating on a lead-in wire which comprises placing a metal sleeve on the lead-in with the end of said lead-in protruding a small amount, and passing sufficient current through said protruding end to weld the near end of said sleeve to said lead-in.

4. The method of producing a metal coating on a lead-in wire which has been sealed into a vitreous body which comprises placing a metal sleeve on the lead-in wire with the end of said lead-in protruding a small amount, applying a welding heat to the exposed end of said lead-in, and simultaneously maintaining the portion of said lead-in adjacent to said vitreous body at a low temperature.

5. The method of producing a metal coating on a lead-in which has been sealed into a vitreous body which comprises placing a metal sleeve on the lead-in wire with the end of said inlead protruding a small amount, gripping said sleeve between heat absorbing jaws of large thermal capacity, applying an electrode to the exposed end of said lead-in, and passing a current from said jaws to said electrode through said lead-in to raise the exposed end of said lead-in to a welding temperature.

Signed at Hoboken in the county of Hudson and State of New Jersey this 7th day of January A. D. 1929.

WARREN R. WALKER.